United States Patent
Aho et al.

(10) Patent No.: US 9,946,463 B2
(45) Date of Patent: Apr. 17, 2018

(54) COMPRESSION OF INDIRECTION TABLES

(71) Applicant: HGST Netherlands B.V., Amsterdam (NL)

(72) Inventors: Stephanie Louise Aho, Rochester, MN (US); David Robison Hall, Rochester, MN (US); John Helmy Shaker Marcos, Madison, WI (US)

(73) Assignee: Western Digital Technologies, Inc., San Jose, CA (US)

(*) Notice: Subject to any disclaimer, the term of this patent is extended or adjusted under 35 U.S.C. 154(b) by 153 days.

(21) Appl. No.: 15/208,118

(22) Filed: Jul. 12, 2016

(65) Prior Publication Data
US 2018/0018100 A1    Jan. 18, 2018

(51) Int. Cl.
G06F 12/00 (2006.01)
G06F 3/06 (2006.01)
G06F 12/1009 (2016.01)

(52) U.S. Cl.
CPC ............ *G06F 3/0608* (2013.01); *G06F 3/064* (2013.01); *G06F 3/0689* (2013.01); *G06F 12/1009* (2013.01); *G06F 2212/1044* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 6,449,689 B1 | 9/2002 | Corcoran et al. | |
| 6,816,942 B2 | 11/2004 | Okada et al. | |
| 7,797,609 B2 | 9/2010 | Neuman | |
| 7,992,037 B2 | 8/2011 | Dubnicki et al. | |
| 8,214,698 B2 | 7/2012 | Kim et al. | |
| 8,370,401 B2 | 2/2013 | Gordon et al. | |
| 8,554,745 B2 | 10/2013 | Pawar et al. | |
| 9,122,712 B1* | 9/2015 | Bono | G06F 17/30233 |
| 9,772,952 B1* | 9/2017 | Kujtkowski | G06F 12/1027 |
| 2004/0049651 A1* | 3/2004 | Ervin | G06F 12/063 711/206 |
| 2011/0072198 A1* | 3/2011 | Reiter | G06F 13/14 711/103 |
| 2013/0262411 A1* | 10/2013 | Kadatch | G06F 3/0608 707/693 |
| 2014/0101369 A1* | 4/2014 | Tomlin | G06F 12/0246 711/103 |
| 2014/0122781 A1* | 5/2014 | Smith | G06F 11/1441 711/103 |

FOREIGN PATENT DOCUMENTS

WO    WO-2013067375 A1 *    5/2013    ......... G06F 12/1009

* cited by examiner

*Primary Examiner* — John A Lane
(74) *Attorney, Agent, or Firm* — Foley & Lardner LLP

(57) ABSTRACT

In general, techniques are described for compressing an indirection table. A device comprising a processor and a memory may be configured to perform the techniques. The processor may be configured to form a plurality of physical containers, each of the plurality of physical containers representative of a plurality of physical block addresses, wherein each of the plurality of physical containers corresponds to one or more logical block address. The memory may be configured to store an indirection table that maps the logical block addresses to the plurality of physical containers. The processor may be further configured to perform run-length encoding of the plurality of physical containers to compress the indirection table.

20 Claims, 5 Drawing Sheets

US 9,946,463 B2

COMPRESSION OF INDIRECTION TABLES

TECHNICAL FIELD

This disclosure relates to indirection tables for translating logical block addresses to physical block addresses.

BACKGROUND

Storage devices used in computers or other electronics devices may be non-volatile memory or volatile memory. The main difference between non-volatile memory and volatile memory is that non-volatile memory may continue to store data without requiring a persistent power supply. As a result, non-volatile memory devices have developed into a popular type of memory for a wide range of electronic applications.

Some storage devices utilize physical data addresses for internal mapping of data to storage locations. For example, hard disk drives (HDD) featuring shingle magnetic recording (SMR) may utilize physical block addresses to specify locations of data within the HDD. Operating systems, however, may use logical data addresses to specify logical locations of data. A controller of an HDD may maintain an indirection table, which associates each logical data address used by the operating system with a respective physical block address used internally by the controller of the HDD.

SUMMARY

In some examples, the disclosure describes a method comprising forming, by a processor, a plurality of physical containers, each of the plurality of physical containers representative of a plurality of physical block addresses, and each of the plurality of physical containers corresponding to one or more logical block addresses, determining, by the processor, an indirection table that maps the logical block addresses to the plurality of physical containers, and performing, by a processor, run-length encoding with respect to the plurality of physical containers to compress the indirection table.

In some examples, the disclosure describes a device comprising a processor configured to form a plurality of physical containers, each of the plurality of physical containers representative of a plurality of physical block addresses, wherein each of the plurality of physical containers corresponds to one or more logical block address, and a memory configured to store an indirection table that maps the logical block addresses to the plurality of physical containers. The processor is further configured to perform run-length encoding of the plurality of physical containers to compress the indirection table.

In some examples, the disclosure describes a non-transitory computer-readable storage medium storing instructions that, when executed, cause a processor to form a plurality of physical containers, each of the plurality of physical containers representative of a plurality of physical block addresses, and each of the plurality of physical containers corresponding to one or more logical block addresses, determine an indirection table that maps the logical block addresses to the plurality of physical containers, and perform run-length encoding with respect to the plurality of physical containers to compress the indirection table.

The details of one or more examples are set forth in the accompanying drawings and the description below. Other features, objects, and advantages will be apparent from the description and drawings, and from the claims.

DETAILED DESCRIPTION

Figure 1:
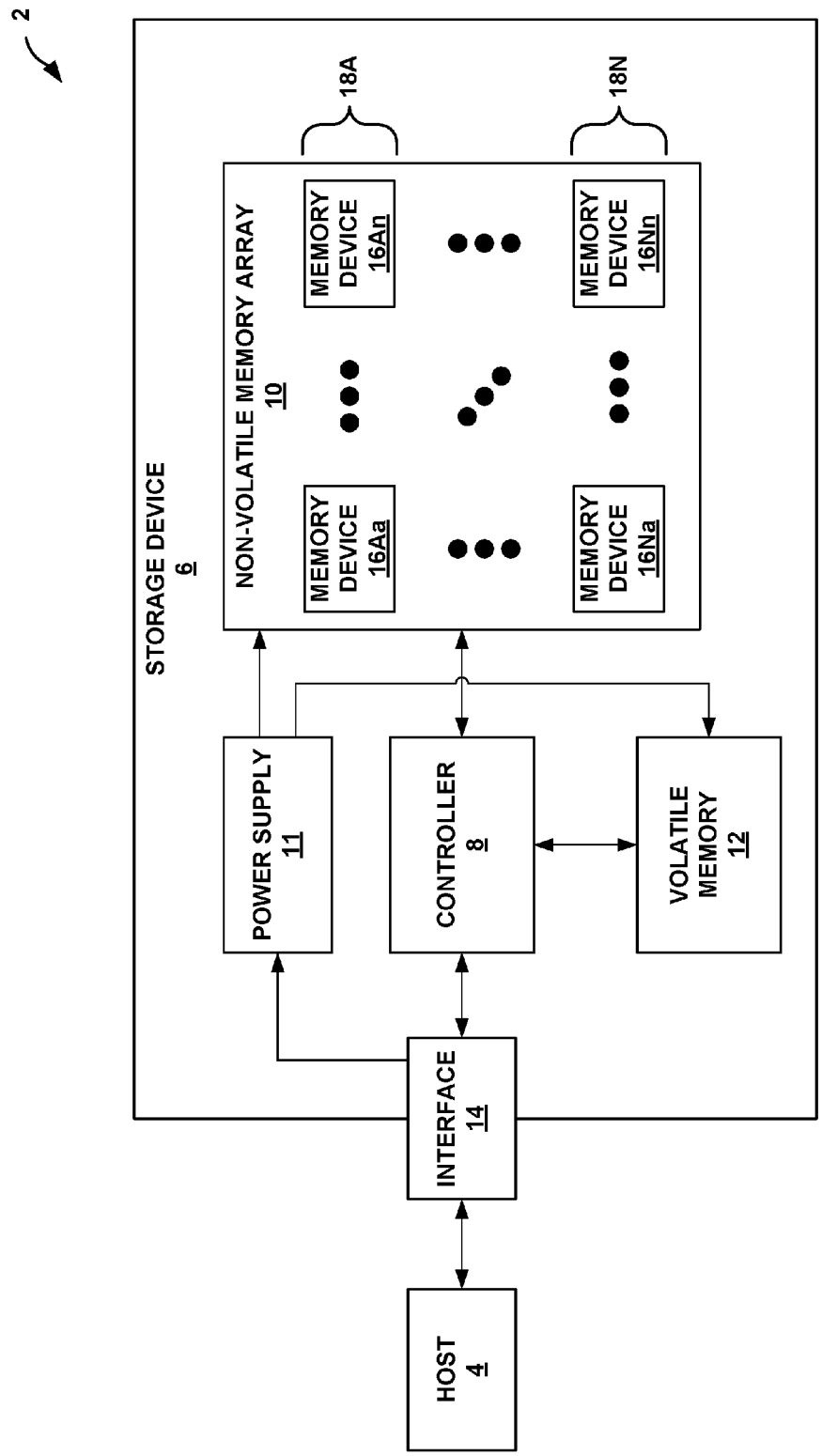
FIG. 1 is a conceptual and schematic block diagram illustrating an example storage environment in which a storage device may function as a storage device for a host device, in accordance with one or more techniques of this disclosure.

The disclosure describes techniques for compressing a logical to physical block address translation table. Hard disk drives (HDDs) previously maintained indirection tables implicitly using modulo arithmetic given that for any given physical block address (e.g., a sector, cylinder, and head tuple) there was only one logical block address. The introduction of disk compression to increase HDD data storage capacities led to any given physical block (e.g., a sector of a given cylinder of a head, where such head identifies one of the platters of magnetic non-transitory storage media) being able to store a variable number of logical blocks. As a result, HDDs began to explicitly maintain an indirection table mapping the logical block addresses to physical block addresses.

That is, a controller of a HDD may compress data associated with a logical block address prior to storing the data to the physical block address to which the logical block address is mapped. As such, the controller may associate one or more logical block addresses with a single physical block address, with the number of logical block addresses associated with any given physical block address varying based on the extent to which the data associated with each logical block address is compressed. The physical block address may, in other words, identify a sector of a fixed size to which compressed data associated with a variable number of logical block addresses may be stored. To maintain these mappings, the controller may explicitly maintain the indirection table.

The techniques described in this disclosure may include associating, by a processor (which may also be referred to as a controller), multiple logical block addresses to a single physical container. The physical container may include one or more physical block addresses. For example, a physical container may include 16 sectors, each sector having a fixed size of 4096 bytes (4 kilobytes—KBs). For each physical container, the processor may fully specify a physical block address. Fully specifying the physical block address may allow precise location of the physical container in a memory. For the remaining physical block addresses associated with the physical container, the processor may not specify respective physical block addresses, thereby reducing the amount of storage space required to specify the indirection table.

The processor may, to further reduce the number of bits used to represent the indirection table, perform run-length encoding with respect to the physical containers. The run-length encoding of the physical containers may result in compression of (or, in other words, a reduction in bits used to represent) the indirection table by merging two or more of the physical containers to reduce the number of physical containers in the indirection table. The reduction in the number of physical containers reduces the size, in bits, of the indirection table by removing the overhead (in terms of bits used to maintain the mapping between physical containers and logical block addresses) associated with the one of the two physical containers merged to form the single resulting physical container. In this way, by reducing the number of bits required to represent the physical containers, the memory consumed by the indirection table may be reduced.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, that may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store and/or retrieve data to and/or from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like. Host device 4 may identify data stored in storage environment 2 using logical or virtual addresses.

As illustrated in FIG. 1 storage device 6 may include controller 8, non-volatile memory array 10 (NVMA 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6; and the like. In some examples, the physical dimensions and connector configurations of storage device 6 may conform to one or more standard form factors. Some example standard form factors include, but are not limited to, 3.5" hard disk drive (HDD), 2.5" HDD, 1.8" HDD, peripheral component interconnect (PCI), PCI-extended (PCI-X), PCI Express (PCIe) (e.g., PCIe x1, x4, x8, x16, PCIe Mini Card, MiniPCI, etc.), non-volatile memory express (NVMe), or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel, small computer system interface (SCSI), serially attached SCSI (SAS), peripheral component interconnect (PCI), and PCI-express. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 includes controller 8, which may manage one or more operations of storage device 6. For instance, controller 8 may manage the reading of data from and/or the writing of data to memory devices 16. Controller 8 may represent one or more processors, such as application specific integrated circuits (ASICs), field programmable gate arrays (FPGAs), microprocessors or central processing units (CPUs), graphical processing units (GPUs), or any other form of integrated circuit comprising transistors configured (either by way of execution of instructions or by being physically arranged) to perform the techniques described in this disclosure.

Storage device 6 may include NVMA 10, which may include a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples, of memory devices 16 include, but are not limited to flash memory devices, phase-change memory (PCM) devices, resistive random-access memory (ReRAM) devices, magnetoresistive random-access memory (MRAM) devices, ferroelectric random-access memory (F-RAM), holographic memory devices, magnetic storage media (so-called "platters"), and any other type of non-volatile memory devices.

In some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa- 16An may be grouped into first channel 18A, and memory devices 16Na-16Nn may be grouped into $N^{th}$ channel 18N. The memory devices 16 grouped into each of channels 18 may share one or more connections to controller 8. For instance, the memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 16. In this way, the number of separate connections between controller 8 and memory devices 16 may be reduced. Additionally, as each channel has an independent set of connections to controller 8, the reduction in connections may not significantly affect the data throughput rate as controller 8 may simultaneously issue different commands to each channel.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information 13 in volatile memory 12 until cached information 13 is written to memory devices 16. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

In some examples, controller 8 may use volatile memory 12 to store an indirection table. Storage devices, such as hard disk drives (HDDs), previously maintained indirection tables implicitly using modulo arithmetic given that for any given physical block address (e.g., a sector, cylinder, and head tuple) there was only one logical block address. The introduction of disk compression to increase HDD data storage capacities led to any given physical block (e.g., a sector of a given cylinder of a head, where such head identifies one of the platters of magnetic non-transitory storage media) being able to store a variable number of logical blocks. As a result, HDDs began to explicitly maintain an indirection table mapping the logical block addresses to physical block addresses.

That is, controller 8 of storage device 6 may compress data associated with a logical block address prior to storing the data to the physical block address to which the logical block address is mapped. As such, controller 8 may associate one or more logical block addresses with a single physical block address, with the number of logical block addresses associated with any given physical block address varying based on the extent to which the data associated with each logical block address is compressed. The physical block address may, in other words, identify a sector of a fixed size to which compressed data associated with a variable number of logical block addresses may be stored. To maintain these mappings, controller 8 may explicitly maintain the indirection table.

The techniques described in this disclosure may include associating, by a processor 8 (which may also be referred to as "controller 8"), multiple logical block addresses to a single physical container. The physical container may include one or more physical block addresses. For example, a physical container may include 16 sectors, each sector having a fixed size of 4096 bytes (4 kilobytes—KBs). For each physical container, controller 8 may fully specify a physical block address, e.g., a single physical block address. Fully specifying the physical block address may allow precise location of the physical container in a memory.

For the remaining physical block addresses associated with the physical container, controller 8 may not specify respective physical block addresses, thereby reducing the amount of storage space required to specify the indirection table. That is, each physical container includes a set number (i.e., 16 in this example) of one or more sequential physical block addresses. As such, controller 8 may only need to maintain an association between the first (sequentially) physical block address of the one or more physical block addresses and the physical container. Controller 8 may reference the remaining physical block addresses implicitly given the fixed size of each physical block (i.e., sector in this example).

Controller 8 may, to further reduce the number of bits used to represent the indirection table, perform run-length encoding with respect to the physical containers. The run-length encoding of the physical containers may result in compression of (or, in other words, a reduction in bits used to represent) the indirection table by merging two of the physical containers to reduce the number of physical containers tracked in the indirection table. The reduction in the number of tracked physical containers reduces the size, in bits, of the indirection table by removing the overhead (in terms of bits used to maintain the mapping between physical containers and logical block addresses) associated with the one of the two physical containers merged to form the single resulting physical container. In this way, by reducing the number of bits required to represent the physical containers, the memory consumed by the indirection table may be reduced.

Some storage devices utilize physical data addresses for internal mapping of a block to storage locations. For example, hard disk drives (HDD) may utilize physical block addresses to specify locations of data within the HDD. A physical block address for a HDD may include, in some examples, a cylinder, head, and sector (CHS) tuple. Operating systems, however, may use logical block addresses to specify logical locations of data. Because of the use of different addresses for data, a controller of a HDD may translate a logical block address to a physical block address.

To improve storage capacities of HDDs, driver controllers may compress data stored to physical blocks (e.g., a given sector of a cylinder of a given platter identified by a head). The result of this compression may effectively allow for a given physical block to store multiple logical blocks. The extent of the compression may vary depending on characteristics of the data, resulting in any given one of the physical blocks storing a variable number of logical blocks.

The drive controller may further define physical containers that each includes a number of physical block addresses. Rather than specify each one of the physical block addresses, the drive controller may associate the physical container with a single one of the included physical block addresses (e.g., the first sequential one of the physical block addresses) and associated one of the logical block addresses to further compress the indirection table.

As HDD capacities increase, the number physical containers increases and the number of indirection table entries mapping the physical container to the logical block addresses increases. For example, assuming each physical container includes 16 physical block addresses (where each physical block address may, in this example, refer to a four kilobyte—4 KB—sector), a one terabyte (1 TB) HDD has 15,625,000 physical containers. In some examples, fully specifying the physical block address for each physical container may utilize 6 bytes of data. Thus, in this example, the size of the indirection table for a 1 TB HDD with 64 KB physical containers is almost one gigabyte (GB).

In many implementations, the indirection table is stored in volatile memory, such as dynamic random-access memory (DRAM). However, including additional DRAM may increase a bill of materials (BOM) of the flash storage device. One alternative may be to store the indirection table in non-volatile memory, but this alternative may consume storage space otherwise available for host device or user data.

In accordance with one or more techniques of this disclosure, controller 8 may run-length encode the indirection table to compress the indirection table. Controller 8 may first form a plurality of physical containers, each of which may include a plurality of physical block addresses. For one of the physical block addresses in the physical container, controller 8 may fully specify a physical block address corresponding to the logical block address. For example, the fully specified physical block address may correspond to a first physical block address in the physical container (where the first physical block address refers to the first logical block address in the sequentially ordered physical container, which may be the lowest valued physical block address in the merged physical container). By fully specifying the physical block address, controller 8 may specify all location attributes such that the physical block address points to a precise location of memory devices 16 (e.g., a precise one of memory devices 16, a precise block, a precise sector, etc.).

For the remainder of the physical block addresses in the physical container, controller 8 may not specify the respective physical block address. In this way, controller 8 may track only a single physical block address per physical container.

Similarly, for each physical container, controller 8 may fully specify a logical block address (e.g., a single logical block address) associated with a physical block in the physical container. For example, the fully specified logical block address may be associated with the first physical block address in the physical container (where the first physical block address refers to the first logical block address in the sequentially ordered physical container, which may be the lowest valued physical block address in the merged physical container). The fully specified logical block address also may be a first logical block address in a sequential set of logical block addresses associated with the physical container. In some examples, controller 8 also tracks a number of logical block addresses associated with each physical container.

Controller 8 does not need to specify the remaining physical or logical block addresses given that controller 8 reads an entire physical container and decompresses the data stored to the logical blocks associated with each physical container to recover the data associated with each logical block address. Controller 8 may index into the decompressed data given that each physical block is a fixed size. As such, controller 8 may use the fixed size in conjunction with the index (which is the difference between the logical block address requested and the logical block address mapped to the fully specified physical block address) to locate any given logical block of data. By not specifying the remainder of the physical block addresses and the corresponding logical block address, controller 8 may further reduce the size (in bits) of the indirection table.

In any event, controller 8 may next perform run-length encoding with respect to the physical containers maintained in the indirection table to compress (e.g., reduce the size in bits of) the indirection table. The controller 8 may iteratively perform the run-length encoding of the indirection table to achieve a target size (e.g., in bytes) of the indirection table. Controller 8 may first identify two adjacent physical containers in the indirection table having the same number of logical blocks (as identified by the number of logical block addresses), and may perform a first order form of the run-length encoding with respect to the two adjacent physical containers having the same number of logical blocks.

When performing this first order run-length encoding, controller 8 may merge the two adjacent physical containers in the indirection table associated with the same number of logical blocks such that the first one of the physical containers (sequentially, in terms of physical block addresses) becomes the resulting merged physical container. Controller 8 may update the merged physical container to indicate that the merged physical container represents the two adjacent physical containers using run-length encoding notation, as described in more detail below. Controller 8 may perform the first order run-length encoding with respect to the entire or a portion of the indirection table, comparing the size of the resulting run-length encoded indirection table to a target size (which may be defined by a size of volatile memory 12 in bytes available to store the indirection table).

In some examples, when the size of the first order run-length encoded indirection table exceeds the target size (in bytes), controller 8 may perform a second order form of the run-length encoding in which controller 8 may merge two adjacent physical containers having a number of logical blocks that differ from one another by one logical block. Controller 8 may, in this instance, merge the two adjacent physical containers associated with the differing number of logical blocks so as to ensure that the logical block addresses will not occur prior to the merged physical container (where the first logical block address refers to the first logical block address in the sequentially ordered physical container, which may be the lowest valued logical block address associated with the merged physical container). Controller 8 may maintain (e.g., only during application of the run-length encoding) an indication of how "shifted" the logical block representation is from the actual logical block representation. This shifted indication may only, in some examples, be an integer value greater than or equal to zero to ensure that that the logical block addresses will not occur prior to the merged physical container.

In some examples, controller 8 may again compare the second order run-length encoded indirection table to the target size. When the second order run-length encoded indirection table exceeds the target size, controller 8 may perform a third order form of the run-length encoding that merges two adjacent physical containers having a number of logical blocks that differ from one another by two. Controller 8 may then proceed as noted above with respect to the second order run-length encoding to further compress the indirection table, iterating with higher order forms of the run-length encoding until the run-length encoded indirection table meets or is below the target size.

In this way, by reducing the number of bits required to represent the physical containers, controller 8 may reduce the memory consumed by the indirection table. In other words, the run-length encoding of the physical containers in the indirection table may result in compression of (or, in other words, a reduction in bits used to represent) the indirection table by merging two of the physical containers to reduce the number of physical containers in the indirection table. The reduction in the number of physical containers in the indirection table reduces the size, in bits, of the indirection table by removing the overhead (in terms of bits used to maintain the logical block address to physical block address mapping) associated with the one of the two physical containers merged to form the single resulting merged physical container. As such, controller 8 may compress the indirection table to reduce consumption of volatile memory 12 or NVMA 10, which may potentially reduce costs associated with storage device 6.

Figure 2:
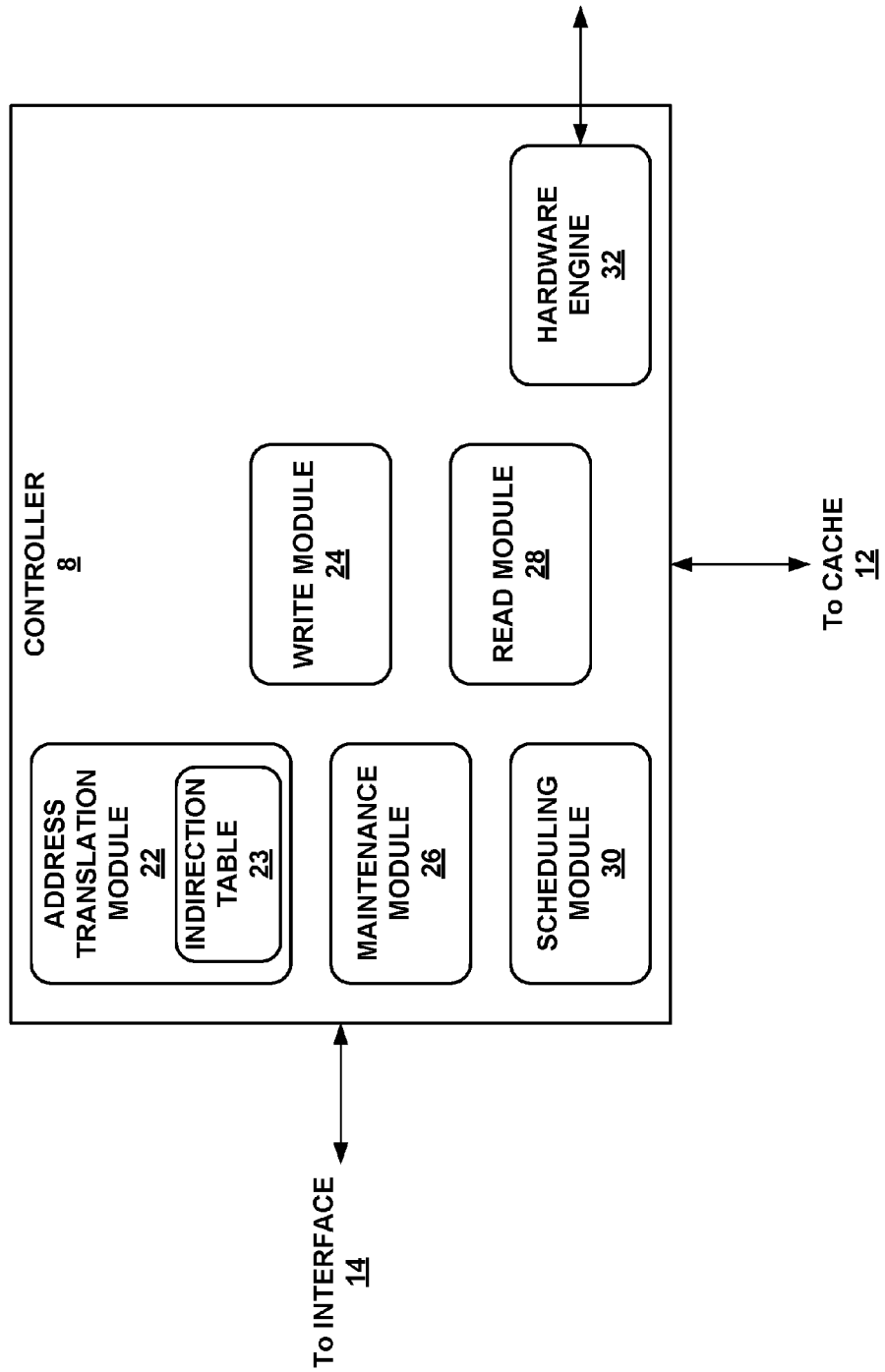
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include an address translation module 22, a write module 24, a maintenance module 26, a read module 28, a scheduling module 30, and a plurality of channel controllers 32A-32N (collectively, "channel controllers 32"). In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with the host device 4 via interface 14 and manage the storage of data to and the retrieval of data from memory devices 16. For example, write module 24 of controller 8 may manage writes to memory devices 16. Write module 24 may receive a message from host device 4 via interface 14 instructing storage device 6 to store data associated with a logical data address and the data. Write module 24 may manage writing of the data to memory devices 16.

For example, write module 24 may communicate with address translation module 22, which manages translation between logical data addresses used by host device 4 to manage storage locations of data and physical data addresses used by write module 24 to direct writing of data to memory devices 16. Address translation module 22 of controller 8 may utilize an indirection table 23 that associates logical block addresses of blocks stored by memory devices 16 to physical block addresses of blocks stored by memory devices 16 (using the physical containers of the techniques described in this disclosure). For example, host device 4 may utilize the logical block addresses of the blocks stored by memory devices 16 in instructions or messages to storage device 6, while write module 24 utilizes physical block addresses of the blocks to control writing of data to memory devices 16. (Similarly, read module 28 may utilize physical block addresses to control reading of blocks from memory devices 16.) The physical block addresses correspond to actual, physical locations of blocks of memory devices 16. In some examples, address translation module 22 may store indirection table 23 in volatile memory 12 shown in the example of FIG. 1.

In this way, host device 4 may be allowed to use a static logical block address for a certain set of data, while the physical block address at which the data is actually stored in memory devices 16 may change. Address translation module 22 may maintain indirection table 23 to map the logical block addresses to physical block addresses to allow use of the static logical block address by the host device 4 while the physical block address of the data may change, e.g., due to wear leveling, garbage collection, write operations (such as those involved in shingled magnetic recording (SMR) HDDs or SSDs) or the like. In some examples, indirection table 23 may be a single layer table, such that by applying a hash to a logical block address received from host device 4, address translation module 22 may directly retrieve a corresponding physical block address.

As discussed above, write module 24 of controller 8 may perform one or more operations to manage the writing of data to memory devices 16. For example, write module 24 may manage the writing of data to memory devices 16 by selecting one or more blocks within memory devices 16 to store the data and causing memory devices of memory devices 16 that include the selected blocks to actually store the data. As discussed above, write module 24 may cause address translation module 22 to update indirection table 23 based on the selected blocks. For instance, write module 24 may receive a message from host device 4 that includes a unit of data and a logical data address, select a block and page within a particular memory device of memory devices 16 to store the data, cause the particular memory device of memory devices 16 to actually store the data (e.g., via a channel controller of channel controllers 32 that corresponds to the particular memory device), and cause address translation module 22 to update indirection table 23 to indicate that the logical block address corresponds to the selected physical block address within the particular memory device of memory devices 16.

In some examples, in addition to causing the data to be stored by memory devices 16, write module 24 may cause memory devices 16 to store information which may be used to recover the unit of data should one or more of the blocks fail or become corrupted. The parity information may be used to recover the data stored by other blocks. In some examples, the parity information may be an XOR of the data stored by the other blocks.

In certain types of magnetic media, such as shingled magnetic recording (SMR) magnetic media, the write head may be wider than the track in the platter. As such, writing data to blocks in the tracks may result in over-writing adjacent tracks in the platter. As such, any data stored to the adjacent tracks is read and re-written to another track to preserve the data. As a result of the re-write, controller 8 of SMR HDDs may utilize logical block addresses as a layer of abstraction that maintains a fixed address from the perspective of host 4 so as to allow for re-writes of data that only requiring updating indirection table 23 to reflect the new re-written location of data.

Responsive to receiving a write command from host device 4, write module 24 may determine at which physical locations (e.g., blocks or sectors) of memory devices 16 to write the data. For example, write module 24 may request from address translation module 22 or maintenance module 26 one or more physical block addresses that are empty (e.g., store no data), partially empty (e.g., only some physical containers store data), or store at least some invalid (or stale) data. Upon receiving the one or more physical block addresses, write module 24 may select one or more block as discussed above, and communicate a message that causes hardware engine 32 to write the data to the selected blocks. Hardware engine 32 may include a preamplifier, a servo controller and at least one read/write head.

Read module 28 similarly may control reading of data from memory devices 16. For example, read module 28 may receive a message from host device 4 requesting data with an associated logical block address. Address translation module 22 may convert the logical block address to a physical block address using indirection table 23. Read module 28 then may control hardware engine 32 to retrieve the data from the physical block addresses. Similar to write module 24, read module 28 may select one or more blocks and communicate a message to hardware engine 32 that causes hardware engine 32 to read the data from the selected blocks.

Maintenance module 26 may be configured to perform operations related to maintaining performance and extending the useful life of storage device 6 (e.g., memory devices 16). When storage device 6 represents a HDD, controller 8 may not necessarily include maintenance module 26 or may include a maintenance module that performs defragmenting or other maintenance operations.

Scheduling module 30 of controller 8 may schedule operations to be performed by memory devices 16. For instance, scheduling module 30 may cause one or more of memory devices 16 to perform one or more operations based on requests received from other components of controller 8. In some examples, scheduling module 30 may cause a particular memory device of memory devices 16 to perform one or more operations by causing hardware engine 32 to output commands to the particular memory device. As one example, scheduling module 30 may permit hardware engine 32 to output commands that cause memory device 16Aa to store data.

In accordance with one or more techniques of this disclosure, controller 8 may perform run-length encoding with respect to physical containers of indirection table 23 that map logical block addresses to physical block addresses. As noted above, controller 8 may perform run-length encoding with respect to the physical containers to compress indirection table 23. Controller 8 may iteratively perform the run-length encoding of indirection table 23 to achieve a target size (e.g., in bytes) of indirection table 23. Controller 8 may iteratively perform the first order and, optionally, successive order run-length encoding to compress indirection table 23 so as to achieve a target size for the run-length encoded (or, in other words, compressed) version of the indirection table 23.

Figure 3:
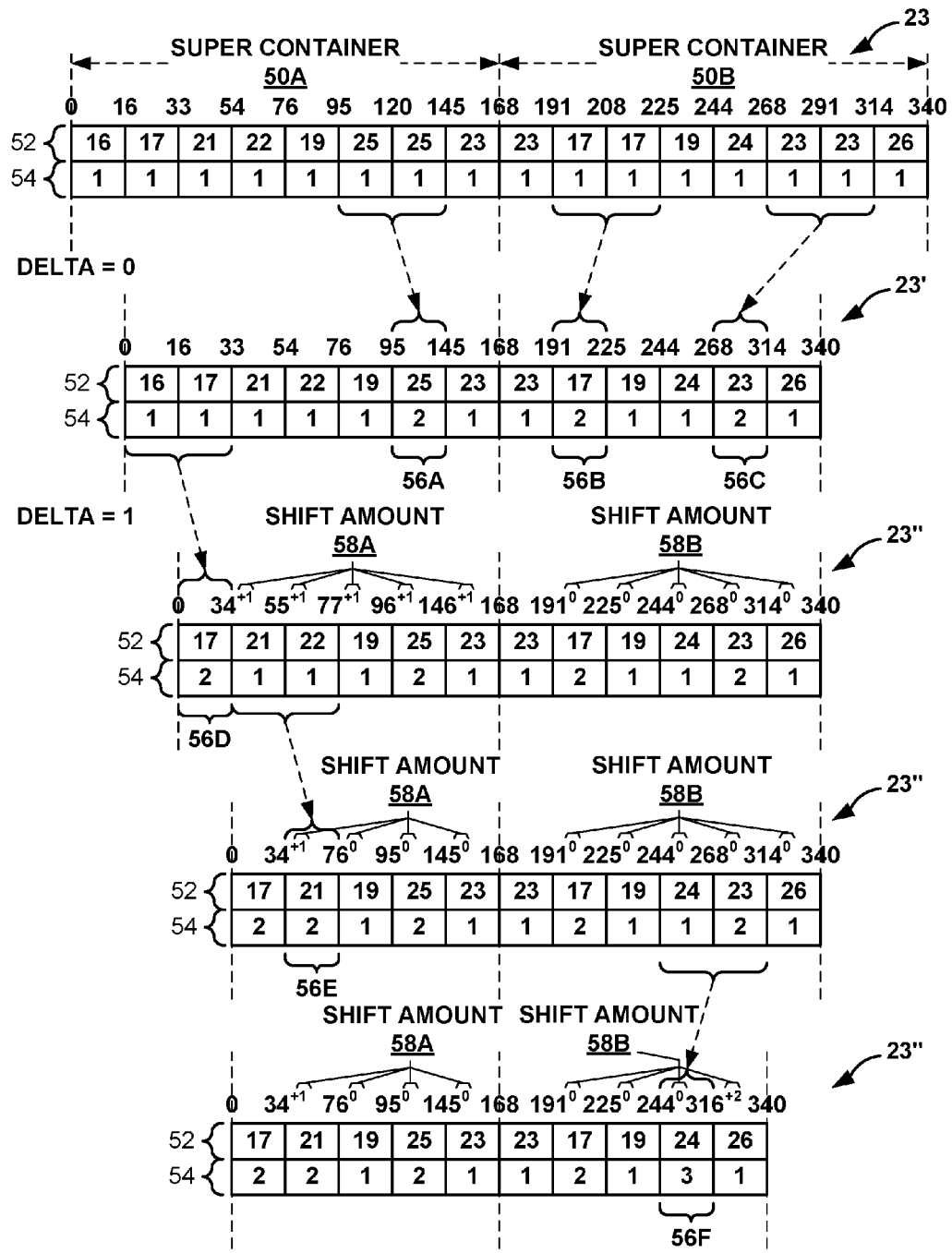
FIG. 3 is a diagram illustrating an example application of the iterative run-length encoding by an address translation module of the controller shown in FIG. 2 to a logical to physical block address translation table in accordance with various aspects of the techniques described in this disclosure.

For example, address translation module 22 may perform the iterative run-length encoding with respect to indirection table 23. FIG. 3 is a diagram illustrating an example application of the iterative run-length encoding by address translation module 23 of controller 8 to indirection table 23 in accordance with various aspects of the techniques described in this disclosure.

In the example of FIG. 3, address translation module 23 may define indirection table 23 to include a first super container 50A and a second super container 50B. Super container 50A includes a plurality of physical containers 52, which may be denoted as "physical containers 52A." Super container 50B includes a plurality of physical containers 52, which may be denoted as "physical containers 52B." The number in each of the plurality of physical containers 52 denotes the number of logical block addresses in each of the respective one of the physical containers 52.

Indirection table 23 also includes run-length information 54 for each of the respective one of the physical containers 52. Run-length information 54 may identify the number of physical containers having the number of logical block addresses identified by the number in each corresponding one of the physical containers 52. For example, the far-left one of physical containers 52A of super container 50A may represent one physical container having 16 logical block addresses (or, in other words, logical blocks identified by the logical block addresses).

As described above, when performing the first order run-length encoding, controller 8 may merge the two adjacent physical containers having the same number of blocks such that the first one of the physical containers (sequentially, in terms of logical block addresses) becomes the resulting merged physical container. In this instance, address translation module 22 may identify those of the physical containers 52 within a same one of super containers 50A or 50B (collectively "super containers 50") that have the same number of blocks. Super containers 50 in this respect may identify a lower limit in which data may be stored. In other words, super containers 50 may each reset the run-length encoding to reduce the number of physical media accesses controller 8 may perform to locate the data in view of the imprecise preservation of the location of the data that results from run-length encoding of indirection table 23 as described in more detail below.

In the example of FIG. 3, address translation module 22 may identify two adjacent ones of physical containers 52A of super container 50A having a same number (i.e., 25) of logical blocks. Address translation module 22 may merge the two adjacent ones of logical block address containers 52A having the same number (i.e., 25 in the example of FIG. 3) of logical blocks to form a single physical container 56A and update run-length information 54 associated with the merged physical container to indicate that the resulting merged physical container represents two physical containers as shown in compressed logical to physical block address translation table 23'.

The numbers above each of physical containers 52 may represent the total number of logical blocks in the respective physical container and preceding physical containers of the corresponding super container (as identified by the logical block addresses). In compressed indirection table 23', the numbers above the resulting merged physical container runs from 95 to 145 to reflect that the merged physical container includes 50 logical block addresses (which is the number of logical blocks, i.e., 25 in the example of FIG. 3, multiplied by run-length information 54 for the corresponding merged logical block address container, i.e., 2 in the example of FIG. 3). Address translation module 22 may perform similar first order run-length encoding operations with respect to super container 50B, generating merged physical containers 56B and 56C of compressed indirection table 23' from two different sets of adjacent physical containers 52B of super container 50B of indirection table 23.

In some examples, address translation module 22 may, after performing the first order run-length encoding, compare a size of compressed indirection table 23 to the target size. Assuming that the size of compressed indirection table 23' exceeds the target size, address translation module 22 may perform a second order form of run-length encoding with respect to compressed indirection table 23'.

When performing the second order run-length encoding, address translation module 22 may define a shift value (which may be temporary and only for purposes of performing second and higher order forms of run-length encoding) for each physical container 52 identifying a shift amount reflective of the amount of shift resulting from merging two adjacent ones of the physical containers 52 having different numbers of logical blocks. Address translation module 22 may not maintain shift values for logical block addresses at the starting edge of each super container 50 given that the actual mapping is specified at every super container boundary.

In the first order run-length encoding described above, address translation module 22 merged adjacent ones of physical containers having the same (or, in other words, a delta of zero) number of logical blocks. In the second order run-length encoding, address translation module 22 may increment the delta by one from zero to one and identify adjacent ones of the physical containers having a different number of logical blocks (or, in other words, delta) equal to one.

As shown in the example of FIG. 3, address translation module 22 may identify two adjacent ones of physical containers 52A having 16 and 17 logical blocks respectively and therefore a delta of one in terms of number of logical blocks. Address translation module 22 may merge the adjacent ones of physical containers 52A having 16 and 17 logical blocks to generate merged physical container 56D of compressed indirection table 23".

Given that the adjacent two of the logical block address containers having 16 and 17 logical blocks differ in the number of logical blocks, address translation module 22 may determine a logical block address shift amount 58A for each of physical containers 52A within super container 52A that occurs after merged physical container 56D (or, in other words, subsequent to merged physical container 56D in indirection table 23"). In some instances, address translation module 22 may be configured to ensure that a logical block of one of the merged physical containers occurs prior to the single physical container resulting from the merger (which may be referred to herein as the "merged physical container" as exemplified by merged physical containers 56A-56F shown in the example of FIG. 3).

To ensure that a logical block of one of the merged physical container occurs prior to the merged physical container, address translation module 22 may determine shift amount 58A to be equal to or greater than zero. For example, address translation module 22 may determine shift amount 58A as a function of one or more of the number of logical blocks in one or both of the physical containers to be merged, the delta, the run-length information for one or more of the physical containers to be merged, and the resulting merged physical container.

To illustrate, consider shift amount 58A in which address translation module 22 may first determine the current shift amount for each of the physical containers (which in this example would be zero). When the current shift amount of the physical containers is zero, address translation module 22 may utilize the larger number of logical blocks (i.e., 17, in the example of FIG. 3) of the two physical containers to be merged. Address translation module 22 may utilize the larger number of logical block amounts because the larger number of logical block amounts results in incrementing the shift amount by the delta for all logical block amounts subsequent to resulting merged physical block 56D within the same super container, and the shift amount is equal or greater than zero.

Address translation module 22 may repeat the foregoing process with respect to the next two adjacent physical containers 52A of super container 50A having 21 and 22 logical blocks, respectively. In this instance, address translation module 22 may select the one of physical containers having 21 logical blocks given the positive one value for shift amount 58A. Address translation module 22 may select the lower logical block amount because shift amount 58A (+1) minus the delta (1) results in a shift amount 58A of zero, thereby realigning the logical blocks with their original address values (i.e., 76 in compressed indirection table 23" is the same as 76 in compressed indirection table 23'). Address translation module 22 may, after merging the two adjacent physical containers, generate merged physical container 56E having a number of logical block addresses set to 21 and run length information 54 set to a value of two (which is determined by incrementing the run-length information of 1 by 1).

Given that no more delta one adjacent physical containers 52A are present in super container 50A, address translation module 22 may next analyze super container 50B, identifying two adjacent physical containers having 24 and 23 logical blocks (a delta of one). Address translation module 22 may first determine shift amount 58B is equal to zero for the two identified ones of physical containers 52B. As such, address translation module 22 may select the larger number of block amounts (i.e., 24 in this example). Address translation module 22 may next merge the two identified ones of the physical containers 52B to generate merged physical container 56F representative of 24 logical blocks with a run length of three and a shift amount of +2. Address translation module 22 may determine shift amount 58B for merged logical block address container 56F as the delta multiplied by run-length information 54 associated with the number of blocks not being used as the number of blocks for resulting merged physical container 56F (i.e., 1*2=+2, in the example of FIG. 3)

Address translation module 22 may determine run-length information 54 for merged physical container 56F as the sum of run-length information 54 for each of the two identified ones of physical containers 52B (i.e., 1+2, in the example of FIG. 3).

These rules regarding use of run-length information 54 of the one of the adjacent physical containers having the non-elected number of logical blocks also applies to the previous merges, except for in those instances in which the run-length information was equal to one. For example, when generating merged physical container 56E, address translation module 22 may determine that the shift amount of 1 minus the delta of one multiplied by the run-length information of one is equal to zero (or, mathematically, $1-(1*1)=0$) and thereby select the lower block amount of 21 rather than the higher block amount of 22 for merged physical container 56E.

Although described as being determined as a function of the delta and run-length information, address translation module 22 may determine shift amounts 58 in other ways.

For example, address translation module 22 may initialize each super container 50 with a logical block address shift of zero. Address translation module 22 may merge the first pair of adjacent logical block address containers to the higher value, determining the logical block address shift amount to be equal to delta*lower number of logical blocks (of the pair). For subsequent merges, address translation module 22 may determine if the delta multiplied by the higher number of blocks (of the subsequent pairs of adjacent logical block address containers) is less than the logical block address shift amount.

When the delta multiplied by the higher number of blocks is less than the logical block address shift amount, address translation module 22 may merge to the lower value (of the subsequent pair) and determine the shift amount equal to the current shift amount−the delta multiple by the higher length (or, mathematically, new_shift_amount=old_shift_amount−(delta*higher_number_blocks)). When the delta multiplied by the higher number of blocks is not less than the logical block address shift amount, address translation module 22 may merge to the higher value (of the subsequent pair) and determine the shift amount equal to the current shift amount+the delta multiple by the lower length (or, mathematically, new_shift_amount=old_shift_amount+(delta*lower_number_blocks)).

In some examples, address translation module 22 may perform multiple orders of run-length encoding in a single pass. In these examples, delta may refer to the difference of the number of logical blocks included in each of the adjacent physical containers being merged. A new variable $delta_{max}$ may denote the upper limit of the delta of logical blocks between adjacent physical containers being merged. Although described as performing multiple iterations with increasingly incremented delta, the techniques may allow address translation module 22 to perform a multi-order single pass of run-length encoding with respect to indirection table 23 to compress indirection able 23.

In this way, by reducing the number of bits required to represent the physical containers, the memory consumed by the indirection table may be reduced. In other words, the run-length encoding of the physical containers may result in compression of (or, in other words, a reduction in bits used to represent) the indirection table by merging two of the physical containers to reduce the number of physical containers in the indirection table. The reduction in the number of physical containers reduces the size, in bits, of the indirection table by removing the overhead (in terms of bits used to maintain the logical block address to physical block address mapping) associated with the one of the two physical containers merged to form the single resulting physical container. As such, controller 8 may compress the indirection table to reduce consumption of volatile memory 12 or NVMA 10, which may potentially reduce costs associated with storage device 6.

Figure 4:
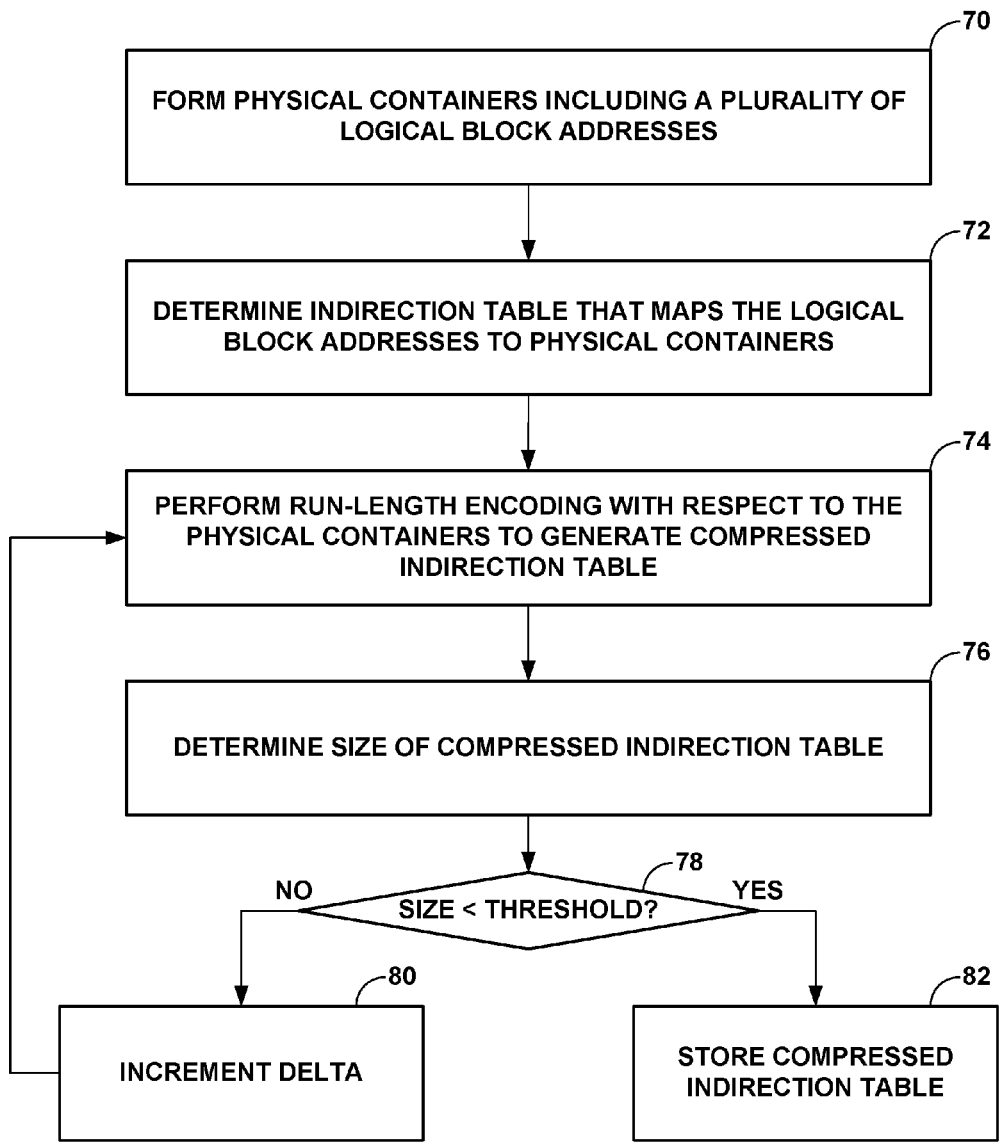
FIG. 4 is a flowchart illustrating an example operation of a storage device in performing the run-length encoding techniques described in this disclosure.

FIG. 4 is a flowchart illustrating exemplary operation of a storage device in performing the run-length encoding techniques described in this disclosure. Initially, the storage device, such as storage device 6 shown in FIG. 1, may form a plurality of physical containers. More specifically, controller 8 of storage device 6 shown in the example of FIGS. 1 and 2 may invoke address translation module 22 to form the plurality of physical containers, each of which includes a plurality of logical block addresses (70).

Address translation module 22 may next determine indirection table 23 that maps the logical block addresses to physical containers (72). Address translation module 22 may perform first order run-length encoding (with a delta of zero as described in detail above when discussing the example of FIG. 3) with respect to the physical containers of the indirection table to generate a compressed indirection table 23' (74). Address translation module 22 may optionally determine a size of compressed indirection table 23' (76) and compare the size of compressed indirection table 23' to a threshold size (78).

In some examples, when the size of compressed indirection table 23' is not less than the threshold size ("NO" 78), address translation module 22 may increment the delta value by one (or, in instances where delta is replaced by $delta_{max}$, set to some higher value) and perform the run-length encoding with respect to the physical containers of compressed indirection table 23' to determine compressed indirection table 23" (80, 74). Address translation module 22 may repeat the foregoing run-length encoding with an increasingly incremented delta (or, increasingly larger $delta_{max}$ when delta is replaced by $delta_{max}$) until the size of the compressed indirection table is less than the threshold (74-80). When the size of compressed indirection table 23' is less than the threshold size ("YES" 78), address translation module 22 may store the compressed indirection table 23' to a memory (e.g., volatile memory 12 or one or more of memory devices 16 shown in FIG. 1) (82).

Figure 5:
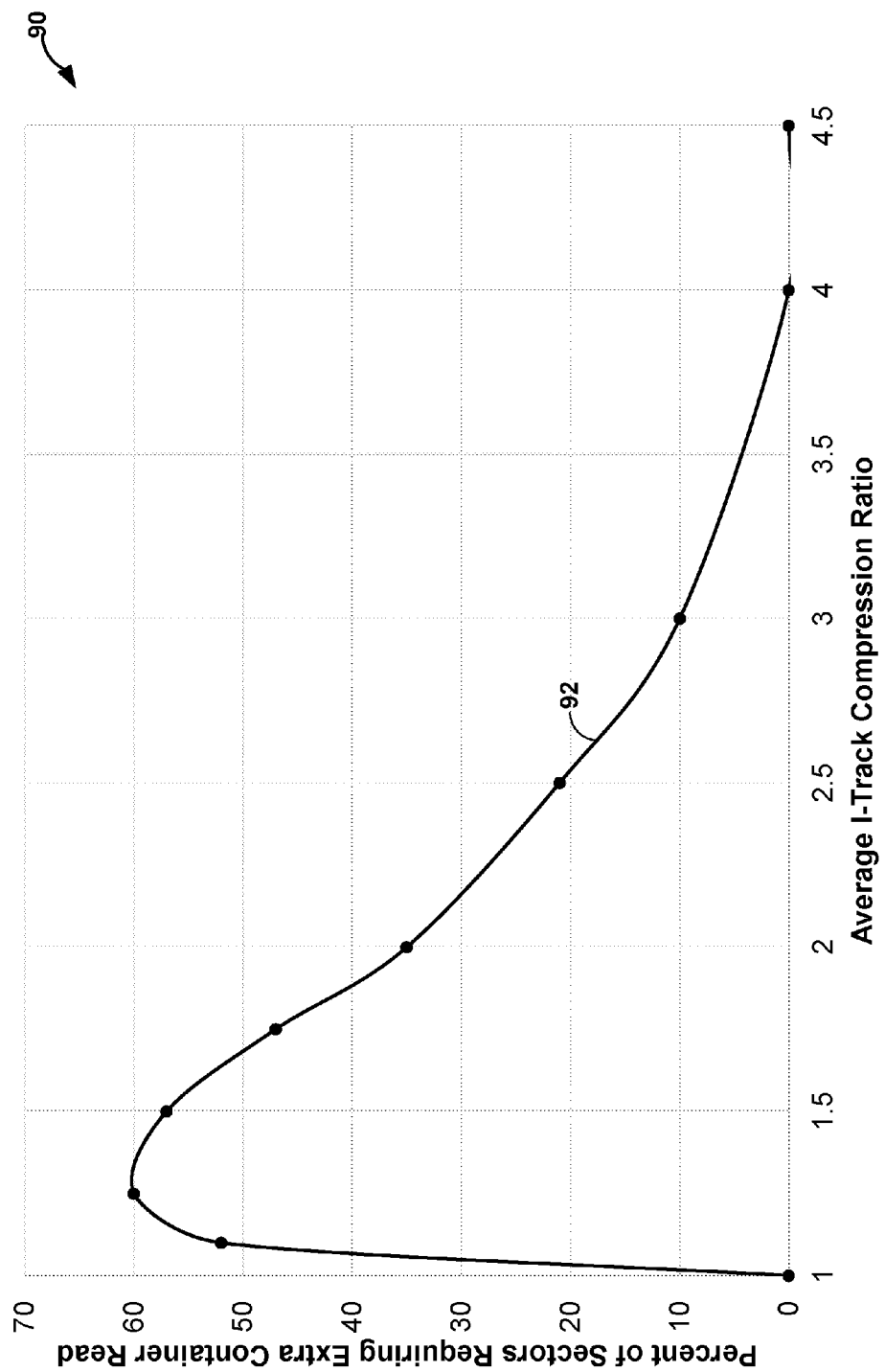
FIG. 5 is a diagram illustrating a graph showing a percent of sectors requiring extra container reads as a function of average track compression ratios that result from application of the run-length encoding techniques described in this disclosure.

FIG. 5 is a diagram illustrating a graph 90 showing an example of a percent of sectors requiring extra container reads as a function of average track compression ratios that result from application of the run-length encoding techniques described in this disclosure. Graph 90 includes a line 92 that shows, for small compression ratios, the percent of sectors requiring extra container reads is high (as a result of having higher shift values for smaller compression ratios) relative to higher compression ratios. Extra container reads are a result of shift amounts where a logical block address is associated with a container located after the container to which the logical block address is currently associated. As such, the controller reads the first one of the physical containers to which the logical block address is currently associated only to discover that the logical block address is stored to the subsequent physical container that was merged. The higher compression ratios may allow for offsetting shift values thereby more closely aligning the data with the original location in the uncompressed version of the indirection tables.

In this way, in some examples, every terabyte (TB) of storage may be represented in the indirection table of a size of approximately 4.4 megabytes (MBs) after having been run-length encoded in accordance with the techniques described in this disclosure. An "I-track" refers to a trackable unit of 16 MB, which may be represented by 70 bytes in the indirection table in some examples. Some example indirection tables may include 8 super containers having two bytes for length, thereby using 16 out of the 70 bytes leaving 54 bytes. One byte may be used per run-length representation, which indicates that the techniques may, in some examples, describe up to 54 run-length sequences.

Moreover, it is assumed that 4 bytes are used per I-track for an I-track initial block address, which adds an additional 256 kilobytes (KB) to the indirection table per terabyte of storage. The foregoing further assumes that a physical container may store 16×4 KB sectors and have a variable number of logical blocks with a maximum of 256 physical containers. Furthermore, each super-container is assumed to contain 32 containers. As such, the techniques may result in the compression noted above that allows for 1 TB of storage to be represented using a 4.4 MB indirection table.

Although no specific designs were discussed above as to how to practically implement the foregoing run-length encoding techniques, a number of considerations may become apparent when attempting to implement the techniques described in this disclosure. For example, some designs may utilize 5 bits for a number of sections and three bits for the run-length information. Alternatives may be to utilize 6 bits for the number of sections and 2 bits for the run-length information. Another alternative may be to use 5 bits for the number of sectors but restrict the values to increase the dynamic range (e.g., use 5 bits to represent a limited range of 16-31 rather than 16-47 with step of 1 and 32-64 with a step of 2). A possible improvement to this latter alternative would be to create a map with the most frequently occurring values (e.g., 64 bytes per map).

As another example, there may be ways by which to select physical container sizes to increase efficiency. As a further example, there may be tradeoffs in selecting different super container sizes. Fewer (larger) super containers may result in more bytes for run-length representations and fewer merge restrictions but require more traversal for longer sequences for super containers. More (smaller) super containers may result in fewer bytes for run-length representations and more merge restrictions but require traversal of shorter sequences for super containers.

As yet another example, there may be trade-offs between accuracy and memory usage. In other words, the 70 bytes per I-track (with 54 bytes for run-length encoding values) may be changed to be 64 bytes for run-length encoding (for 5 MB per TB) or 80 bytes for run-length encoding (for 6 MB per TB).

In some examples, the processor may be a controller of a storage device and the indirection table may be an indirection table for the storage device. In other examples, the processor may be another processor, such as a general purpose processor, and the indirection table may be, for example, a translation lookaside buffer.

Some storage devices utilize physical data addresses for internal mapping of a block to storage locations. For example, hard disk drives (HDD) may utilize physical block addresses to specify locations of data within the HDD. A physical block address for a HDD may include, in some examples, a cylinder, head, and sector (CHS) tuple. Operating systems, however, may use logical block addresses to specify logical locations of data. Because of the use of different addresses for data, a controller of a HDD may translate a logical block address to a physical block address.

To improve storage capacities of HDDs, driver controllers may compress data stored to physical blocks (e.g., a given sector of a cylinder of a given platter identified by a head). The result of this compression may effectively allow for a given physical block to store multiple logical blocks. The extent of the compression may vary depending on characteristics of the data, resulting in any given one of the physical blocks storing a variable number of logical blocks.

The drive controller may further define physical containers that each includes a number of physical block addresses. Rather than specify each one of the physical block addresses, the drive controller may associate the physical container with a single one of the included physical block addresses (e.g., the first sequential one of the physical block addresses) and associated one of the logical block addresses to further compress the indirection table.

As HDD capacities increase, the number physical containers increases and the number of indirection table entries mapping the physical container to the logical block addresses increases. For example, assuming each physical container includes 16 physical block addresses (where each physical block address may, in this example, refer to a four kilobyte—4 KB—sector), a one terabyte (1 TB) HDD has 15,625,000 physical containers. In some examples, fully specifying the physical block address for each physical container may utilize 6 bytes of data. Thus, in this example, the size of the indirection table for a 1 TB HDD with 64 KB physical containers is almost one gigabyte (GB).

In many implementations, the indirection table is stored in volatile memory, such as dynamic random-access memory (DRAM). However, including additional DRAM may increase a bill of materials (BOM) of the flash storage device. One alternative may be to store the indirection table in non-volatile memory, but this alternative may consume storage space otherwise available for host device or user data.

In accordance with one or more techniques of this disclosure, a controller of a storage device may perform run-length encoding with respect to physical containers. The controller may perform the run-length encoding to merge two or more physical containers and thereby reduce the overall number of physical containers in the indirection table. The controller may perform this run-length encoding in such a manner as to ensure that the logical block addresses will not be mapped to a merged physical container.

The controller may perform a first order form of the run-length encoding with respect to two adjacent physical containers having the same number of logical blocks (as identified by the logical block addresses). When performing this first order run-length encoding, the controller may merge the two adjacent physical containers having the same number of logical blocks such that the first one of the physical containers (sequentially, in terms of physical location) becomes the resulting merged physical container. The controller may update the merged physical container to indicate that the merged physical container represents the two adjacent physical containers using run-length encoding notation, as described in more detail below. The controller may perform the first order run-length encoding with respect to the entire or a portion of the indirection table, comparing the size of the resulting run-length encoded indirection table to a target size (which may be defined by a size of DRAM in bytes available to store the indirection table).

In some examples, when the size of the first order run-length encoded indirection table exceeds the target size (in bytes), the controller may perform a second order form of the run-length encoding in which the controller may merge two adjacent physical containers having a number of logical blocks that differ from one another by one logical block. The controller may, in this instance, merge the two adjacent physical containers having the differing number of logical blocks so as to ensure that the logical block addresses will not occur prior to the merged physical container. The controller may maintain an indication of how "shifted" the logical block representation is from the actual logical block representation. This shifted indication may only be greater than or equal to zero to ensure that that the logical block addresses will not occur prior to the merged physical container.

In some examples, the controller may again compare the second order run-length encoded indirection table to the target size. When the second order run-length encoded indirection table exceeds the target size, the controller may perform a third order form of the run-length encoding that merges two adjacent physical containers having a number of logical blocks that differ from one another by another by a value of two. The controller may then proceed as noted above with respect to the second order run-length encoding to further compress the indirection table, iterating with higher order forms of the run-length encoding until the run-length encoded indirection table meets or is below the target size. In this way, the controller may reduce a size (in bytes) of the indirection table.

Although the foregoing examples have been described with respect to a controller of a storage device, in other examples, the examples described herein may be implemented by another processor, such as a general purpose processor, and the logical to physical data address translation table may be, for example, a translation lookaside buffer.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    forming, by a processor, a plurality of physical containers, each of the plurality of physical containers representative of a plurality of physical block addresses, and each of the plurality of physical containers corresponding to one or more logical block addresses;
    determining, by the processor, an indirection table that maps the logical block addresses to the plurality of physical containers; and
    performing, by the processor, run-length encoding with respect to the plurality of physical containers to compress the indirection table.

2. The method of claim 1, wherein performing run-length encoding comprises merging a first one of the plurality of physical containers with a second one of the plurality of physical containers adjacent to the first one of the plurality of physical containers in the indirection table to form a single compressed physical container.

3. The method of claim 1,
    wherein a first one of the plurality of physical containers is adjacent to a second one of the plurality of physical containers in the indirection table,
    wherein the first one of the plurality of physical containers includes a same number of logical block addresses as the second one of the plurality of physical containers, and
    wherein performing run-length encoding comprises merging the first one of the plurality of physical containers and the second one of the plurality of physical containers to form a single compressed physical container.

4. The method of claim 1, wherein performing run-length encoding comprises:
    merging a first one of the plurality of physical containers with a second one of the plurality of physical containers adjacent to the first one of the plurality of physical containers in the indirection table to form a single compressed physical container;
    determining a logical block address shift amount based on a difference in a number of the logical block addresses included in each of the first one of the plurality of physical containers and the second one of the plurality of physical containers; and
    updating a number of logical block addresses in each of the plurality of physical containers subsequent to the single compressed physical container in the indirection table based on the logical block address shift amount.

5. The method of claim 4, wherein determining the logical block address shift amount comprises determining the logical block address shift amount such that the logical block address shift amount is equal to or greater than zero.

6. The method of claim 4, wherein determining the logical block address shift amount comprises determining the logical block address shift amount based on the difference and a previous logical block address shift amount determined for either the first one of the plurality of physical containers or the second one of the plurality of physical containers.

7. The method of claim 6, wherein determining the logical block address shift amount comprises:
    determining the difference to be a negative difference, wherein the magnitude of the negative difference is less than a magnitude of the previous logical block address shift amount; and adding the negative difference to the previous logical block address shift amount such that the logical block address shift amount is equal to or greater than zero.

8. The method of claim 1, wherein performing the run-length encoding comprises iteratively performing the run-length encoding using an iteratively increasing difference between a number of logical block addresses included in adjacent ones of the plurality of physical containers until a threshold amount of compression is achieved.

9. The method of claim 1, wherein the processor comprises a controller of a hard disk drive.

10. A device comprising:
a processor configured to form a plurality of physical containers, each of the plurality of physical containers representative of a plurality of physical block addresses, wherein each of the plurality of physical containers corresponds to one or more logical block address; and
a memory configured to store an indirection table that maps the logical block addresses to the plurality of physical containers,
wherein the processor is further configured to perform run-length encoding of the plurality of physical containers to compress the indirection table.

11. The device of claim 10, wherein the processor is further configured to merge a first one of the plurality of physical containers with a second one of the plurality of physical containers adjacent to the first one of the plurality of physical containers in the indirection table to form a single compressed physical container.

12. The device of claim 10,
wherein a first one of the plurality of physical containers is adjacent to a second one of the plurality of physical containers in the indirection table,
wherein the first one of the plurality of physical containers includes a same number of logical block addresses as the second one of the plurality of physical containers, and
wherein the processor is further configured to merge the first one of the plurality of physical containers and the second one of the plurality of physical containers to form a single compressed physical container.

13. The device of claim 10, wherein the processor is further configured to:
merge a first one of the plurality of physical containers with a second one of the plurality of physical containers adjacent to the first one of the plurality of physical containers in the indirection table to form a single compressed physical container;
determine a logical block address shift amount based on a difference in a number of the logical block addresses included in each of the first one of the plurality of physical containers and the second one of the plurality of physical containers; and
update a number of logical block addresses in each of the plurality of physical containers subsequent to the single compressed physical container in the indirection table based on the logical block address shift amount.

14. The device of claim 13, wherein the processor is further configured to determine the logical block address shift amount such that the logical block address shift amount is equal to or greater than zero.

15. The device of claim 13, wherein the processor is further configured to determine the logical block address shift amount based on the difference and a previous logical block address shift amount determined for either the first one of the plurality of physical containers or the second one of the plurality of physical containers.

16. The device of claim 15, wherein the processor is further configured to:
determine the difference to be a negative difference, wherein the magnitude of the negative difference is less than a magnitude of the previous logical block address shift amount; and
add the negative difference to the previous logical block address shift amount such that the logical block address shift amount is equal to or greater than zero.

17. The device of claim 10, wherein the processor is further configured to iteratively perform the run-length encoding using an iteratively increasing difference between a number of logical block addresses included in adjacent ones of the plurality of physical containers until a threshold amount of compression is achieved.

18. The device of claim 10, wherein the processor comprises a controller of a hard disk drive.

19. A non-transitory computer-readable storage medium storing instructions that, when executed, cause a processor to:
form a plurality of physical containers, each of the plurality of physical containers representative of a plurality of physical block addresses, and each of the plurality of physical containers corresponding to one or more logical block addresses;
determine an indirection table that maps the logical block addresses to the plurality of physical containers, and
perform run-length encoding with respect to the plurality of physical containers to compress the indirection table.

20. The non-transitory computer-readable storage medium of claim 19, wherein the instructions cause the processor to merge a first one of the plurality of physical containers with a second one of the plurality of physical containers adjacent to the first one of the plurality of physical containers in the indirection table to form a single compressed physical container.

* * * * *